United States Patent
Wright et al.

(10) Patent No.: US 10,526,221 B2
(45) Date of Patent: Jan. 7, 2020

(54) SYSTEM AND METHOD FOR STATIC MIXING IN A EPT USING A FLUID CONTAINMENT ASSEMBLY

(71) Applicant: ClearCove Systems, Inc., Victor, NY (US)

(72) Inventors: Terry Wright, Rochester, NY (US); Qausarali Goriawala, Rochester, NY (US); James R. Gaffney, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 0 days.

(21) Appl. No.: 15/887,987

(22) Filed: Feb. 3, 2018

(65) Prior Publication Data

US 2019/0241451 A1    Aug. 8, 2019

(51) Int. Cl.
| | |
|---|---|
| *B01D 21/24* | (2006.01) |
| *C02F 1/52* | (2006.01) |
| *B01D 21/00* | (2006.01) |
| *B01D 21/01* | (2006.01) |
| *C02F 103/32* | (2006.01) |

(52) U.S. Cl.
CPC ........ *C02F 1/5281* (2013.01); *B01D 21/0042* (2013.01); *B01D 21/0087* (2013.01); *B01D 21/01* (2013.01); *B01D 21/2405* (2013.01); *C02F 2103/325* (2013.01)

(58) Field of Classification Search
CPC ............ B01D 21/0036; B01D 21/0042; B01D 21/0087; B01D 21/2405; B01D 21/2422; B01D 21/2427

USPC ....................... 210/519, 532.1, 534, 540, 801
See application file for complete search history.

(56) References Cited

U.S. PATENT DOCUMENTS

| | | | | |
|---|---|---|---|---|
| 1,343,764 | A | * | 6/1920 | Clifford ............. B01D 21/2405 210/519 |
| 3,239,066 | A | * | 3/1966 | Schick .................. C02F 1/5281 210/519 |

(Continued)

OTHER PUBLICATIONS

"Feed-forward automation for cost effective chemical treatment of food manufacturing wastewater." Water Technologies & Solutions Technical Paper. Authors: Peter E. Norman and Carman J. Espinoza. Presented at WEFTEC Conference. Oct. 2014. 8 pages.

*Primary Examiner* — Christopher Upton
(74) *Attorney, Agent, or Firm* — Michael Alan Butler

(57) ABSTRACT

A system and method for static mixing in a waste water settling tank to increase recovery of first entrained solids and solvated materials, comprising a settling tank having a recirculation ring and a hopper bottom defining a sludge hopper having a flat bottom portion, a fluid containment assembly, and a fluid deflector assembly with an optional fluid dispersion assembly. The system further comprises an inlet pipe for introduction of waste water containing second entrained solids and solvated materials into the settling tank and a discharge outlet in proximity to the underside of the fluid deflector assembly with nozzle facing downward. Influent waste water is directed both downward into the fluid containment assembly and upward into the center of the fluid deflector assembly and an optional fluid dispersion assembly to distribute the influent into contact with previously introduced waste water to cause coalescence of the first and second entrained solids.

20 Claims, 9 Drawing Sheets

(56) References Cited

U.S. PATENT DOCUMENTS

| | | | | |
|---|---|---|---|---|
| 4,014,791 A | * | 3/1977 | Tuttle | B01D 17/0208 |
| | | | | 210/519 |
| 4,422,931 A | * | 12/1983 | Wolde-Michael | B01D 21/00 |
| | | | | 210/519 |
| 4,994,179 A | * | 2/1991 | Keeter | B01D 21/2411 |
| | | | | 210/540 |
| 5,076,915 A | | 12/1991 | Rose | |
| 5,252,205 A | * | 10/1993 | Schaller | B01D 21/0042 |
| | | | | 210/540 |
| 5,505,860 A | * | 4/1996 | Sager | B01D 17/00 |
| | | | | 210/519 |
| 5,714,069 A | * | 2/1998 | Sager | B01D 17/0211 |
| | | | | 210/519 |
| 5,718,824 A | * | 2/1998 | Kannan | B01D 21/0036 |
| | | | | 210/532.1 |
| 5,833,865 A | * | 11/1998 | Harato | B01D 21/2405 |
| | | | | 210/519 |
| 5,849,181 A | * | 12/1998 | Monteith | B01D 21/0036 |
| | | | | 210/532.1 |
| 7,972,505 B2 | | 5/2011 | Wright | |
| 8,225,942 B2 | | 7/2012 | Wright | |
| 8,398,864 B2 | | 3/2013 | Wright | |
| 9,643,106 B2 | | 5/2017 | Wright | |
| 9,744,482 B2 | | 8/2017 | Wright | |
| 9,782,696 B2 | | 10/2017 | Wright | |
| 9,855,518 B2 | | 1/2018 | Wright | |
| 9,908,067 B2 | | 3/2018 | Wright | |
| 10,040,697 B2 | * | 8/2018 | Wright | B01D 21/0087 |
| 2010/0001892 A1 | | 1/2010 | Wright | |
| 2010/0108594 A1 | | 5/2010 | Wright | |
| 2015/0182881 A1 | | 7/2015 | Wright | |
| 2015/0183657 A1 | | 7/2015 | Wright | |
| 2015/0183658 A1 | | 7/2015 | Wright | |
| 2016/0008744 A1 | | 1/2016 | Wright | |
| 2016/0089619 A1 | | 3/2016 | Wright | |
| 2016/0090312 A1 | | 3/2016 | Wright | |
| 2016/0107104 A1 | | 4/2016 | Wright | |
| 2016/0107899 A1 | | 4/2016 | Wright | |
| 2016/0243471 A1 | | 8/2016 | Wright | |
| 2016/0288022 A1 | | 10/2016 | Wright | |
| 2017/0072373 A1 | | 3/2017 | Wright | |
| 2017/0073245 A1 | | 3/2017 | Wright | |

* cited by examiner

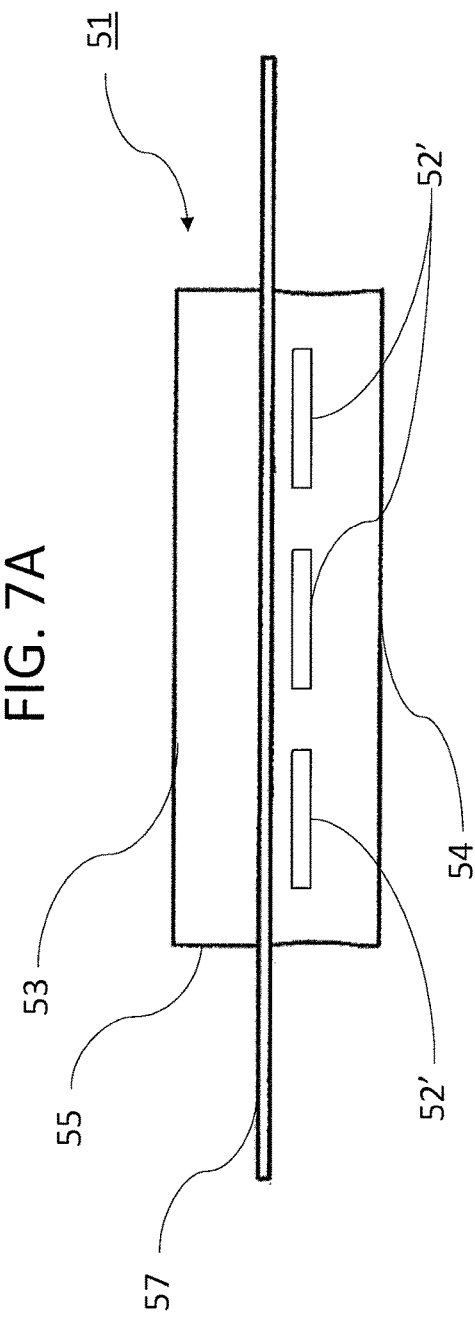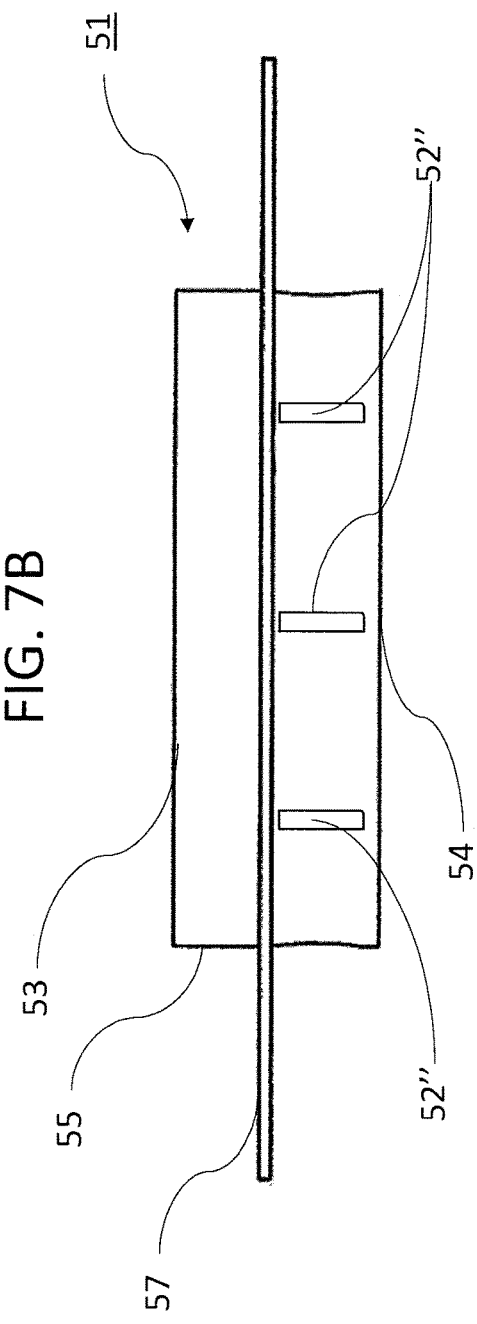

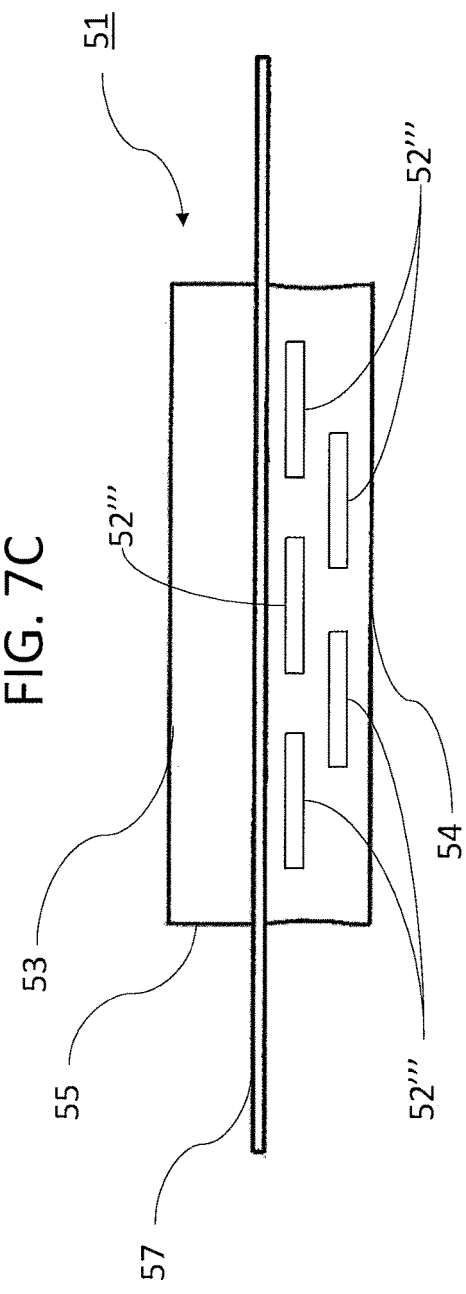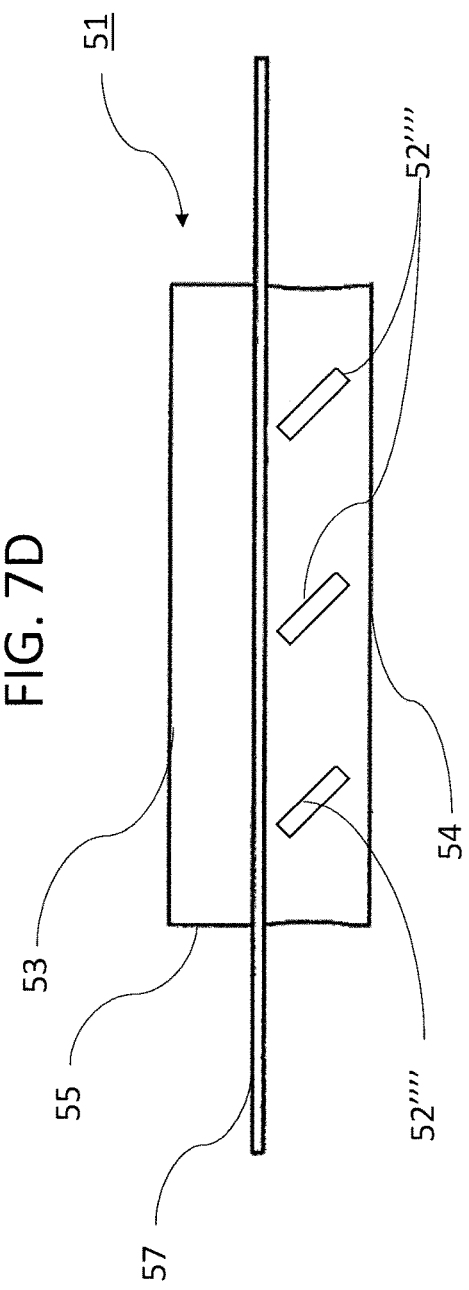

SYSTEM AND METHOD FOR STATIC MIXING IN A EPT USING A FLUID CONTAINMENT ASSEMBLY

FIELD OF THE APPLICATION

Background of the Invention

The present invention is directed to systems for treatment of waste water; more particularly, to systems for removing solids and solvated materials from municipal, agricultural, industrial, and mining waste water streams, e.g., a food process waste water stream; and most particularly to a system for static mixing in a waste water settling tank to increase the percentage of recovery of entrained solids and solvated materials from the waste water. As used herein, "static mixing" refers to apparatuses and methods for mixing of fluids and entrained materials that use stationary elements to accomplish the mixing, as opposed to dynamic elements such as paddle wheels, propellers, stirring bars and the like. As used herein, the term "food materials" should be taken to mean any and all biologically digestible organic materials, without limit; the term "food process waste water" should be taken to mean excess water and by-products, components beyond just water itself, used in the manufacture and/or use of food materials, which water must be treated to remove a portion of the dissolved and/or suspended food materials before being either sent to a waste water treatment facility, landfill, or otherwise discharged to the environment.

Foods and potables manufacturing and handling typically require large volumes of input process water and generate substantial levels of biologically digestible materials dissolved and suspended in their waste process water. Additionally, such waste water may be substantially acidic or alkaline. When directed without pre-treatment to municipal waste water treatment facilities, such waste water can place a heavy and costly load on municipal waste treatment facilities. As a result, many communities impose a substantial cost on companies that generate such process waste waters during their operations. It is known to monitor the level of food materials in food processing waste water discharged to a municipal system and to levy a sewer surcharge on the food processing companies accordingly. Many of these companies are relatively modest in capitalization and output and thus need a relatively inexpensive method and associated apparatus for pre-treating of process waste water to remove a substantial percentage of suspended food materials therefrom before the process waste water is discharged. Fortuitously, the total volume of process waste water generated by many such operations is relatively small and therefore is amenable to treatment by a method and apparatus in accordance with the present invention. Applications directed to water reuse, such as in agricultural applications where treated waste water is needed to water crops, feed livestock, and replenish aquifers, can also be supported by the present invention.

For some of these applications, to remove solids and solvated materials to acceptable levels it may be necessary to use membrane filtration systems, such as ultra-filtration systems, nanofiltration systems, reverse osmosis filtration systems, and the like. Membrane systems may also be necessary when discharging waste water to leach fields to prevent their fouling by yeast and other large organic materials. The use of such membrane systems requires prior stage treatment of the waste water to remove solids and other large materials that would otherwise foul the membrane systems.

Larger scale operations can also be supported by scaling up with multiple modules of the present invention.

Note: "Biological Oxygen Demand" (BOD), also known as Biochemical Oxygen Demand, is the amount of oxygen needed by aerobic microorganisms to decompose all the digestible organic matter in a sample of water; it is used in the eco-sciences as a measure of organic pollution. As used herein, the term "BOD" also means more generally the unit volume load, both dissolved and suspended, of such organic material in waste water.

Further, Total Suspended Solids (TSS) is a water quality measurement which, as used herein, is expressed as the unit volume load of suspended solids, both organic and inorganic, in water. It is listed as a conventional pollutant in the U.S. Clean Water Act.

EXAMPLE

The following example is directed to the characteristics and treatment of waste water generated by breweries. It should be understood that the disclosed method and apparatus are also well-suited to similar usage with many other types of waste water as noted above.

Breweries have unique effluent characteristics and specific treatment needs. Most of the water used by breweries leaves in the form of finished beer, so daily waste water flows are relatively low and comprise mostly cleaning water. The volume of waste water generated by a brewery may range from no more than about 200-300 gallons of process waste water per day for a microbrewery to more than a million gallons per day for a large brewery, with volumes of 20,000 to 80,000 gallons per day more typical of regional and craft breweries.

For cleaning chemicals, breweries typically rely on caustic solutions for removing organic deposits from their process tanks. Acid is used on occasion, as are iodine-based sanitizers and peracetic acid for sanitizing tanks and equipment. These are diluted when used, but will still affect the pH of the final effluent.

Brewery waste water comprises several contributors to the total BOD and TSS load. Most of these are organic in nature and pose no serious threat to public health.

Yeast, spent grain, and hops are the building blocks of beer. Most of the wastes from these components typically are side streamed in the brewery and are often diverted as feed for farm animals. Inevitably, some of that waste also will become mixed with the waste water and thereby raise the BOD and TSS levels of the process effluent.

Wort is the liquid that will become beer once the yeast is added. Wort comprises fermentable and unfermentable sugars as well as starches and proteins. Because wort is rich in dissolved sugar, it is the primary contributor of BOD and SBOD (soluble BOD) in a brewery.

Fermented beer left in tanks after transfers and lost during packaging also contributes to the BOD and SBOD of the effluent leaving the brewery.

Beer has a characteristically low pH (typically 4-5.5) that can reduce the overall pH of the waste water.

Brewery process waste water typically has Biological Oxygen Demand (BOD) levels of 2,000-4,000 mg/l and Total Suspended Solids (TSS) levels of 2,500-3,500 mg/l. The solids are fairly dense and are easily settled out, and much of the dissolved organic load can be precipitated out by dosing the waste water with coagulants. Brewery effluent can typically have a pH range of 2 to 12, depending on what process is taking place in the brewery. The pH may have to be adjusted on occasion to meet municipal requirements and also brought into optimum range for effective chemical treatment. Brewery effluent can have fluctuating levels of BOD, TSS and pH. Occasionally the brewery may have to discard a batch of beer, introducing high levels of BOD into the process waste water.

Typical prior art waste water treatment systems are intended for continuous flow of waste water. However, many manufacturing processes are operated intermittently, e.g., on a day-night cycle, wherein there is little or no flow for significant periods of time. Such a cycle affords an opportunity for a gravity settling apparatus for removing non-floating solids from a waste water stream.

What is needed is an improved Enhanced Primary Treatment (EPT) waste water gravity settling system for removing solids and solvated materials from waste water to improve waste water quality for water reuse and for discharging into municipal sewage systems, leach systems, irrigation ponds, fields, and the like.

What is further needed is an arrangement within such an EPT waste water settling system for increasing the percentage of removal of non-floating biologically-digestible solids.

SUMMARY OF THE INVENTION

Typical prior art waste water treatment systems maintain a continuous flow of influent entering a clarification tank. Effluent exits the clarification tank for secondary treatment. As disclosed in U.S. Pat. No. 7,972,505, "Primary Equalization Settling Tank", U.S. Pat. No. 8,225,942, "Self-Cleaning Influent Feed System for a Waste Water Treatment Plant", U.S. Pat. No. 8,398,864, "Screened Decanter Assembly", U.S. Pat. No. 9,643,106 "Screen Decanter for Removing Solids from Wastewater", U.S. Pat. No. 9,744,482 "Screen decanter for Screening Solids from Waste Water", U.S. Pat. No. 9,782,696 "Method for Maximizing Uniform Effluent Flow Through a Waste Water Treatment System", U.S. Pat. No. 9,855,518, "Method and Apparatus for a Vertical Lift Decanter System in a Water Treatment Systems", U.S. Pat. No. 9,908,067, "Floatables and Scum Removal Apparatus", U.S. Patent Publication No. 20160008744 A1, "IFS and Grit Box for Water Clarification Systems" and U.S. Patent Publication No. 20150183657 A1, "Method and Apparatus for Using Air Scouring of a Screen in a Water Treatment Facility", U.S. Patent Publication No. 20160288022 A1 "System for Processing Wastewater" (hereinafter the '022 publication), the inventor previously has developed systems and processes for primary clarification of the waste water. The above-named applications and patents are incorporated herein by reference in their entirety for all purposes.

A new improved apparatus and method to treat industrial waste water is now described in more detail.

A system to increase the percentage of recovery of entrained solids and solvated materials from waste water comprises a) a settling tank having a hopper bottom defining a sludge hopper; b) a fluid deflector disposed within the space contained in the hopper bottom; c) an inlet pipe for introduction of waste water into the settling tank having a first discharge outlet oriented to discharge a first portion of the waste water toward the fluid deflector and a second discharge outlet oriented to discharge a second portion of the waste water away from the fluid deflector; and d) a fluid containment assembly having an open top, a side wall circumferentially surrounding the inlet pipe's first discharge outlet and second discharge outlet, and an enclosed bottom.

Further features and advantages of the present invention will become apparent to those of ordinary skill in the art in view of the drawings and detailed description of preferred embodiments below.

BRIEF DESCRIPTION OF THE DRAWINGS

FIG. 7A, FIG. 7B, FIG. 7C and FIG. D provide views of alternative embodiments of fluid dispersion apparatus 51.

DETAILED DESCRIPTION OF THE INVENTION

Figure 1:
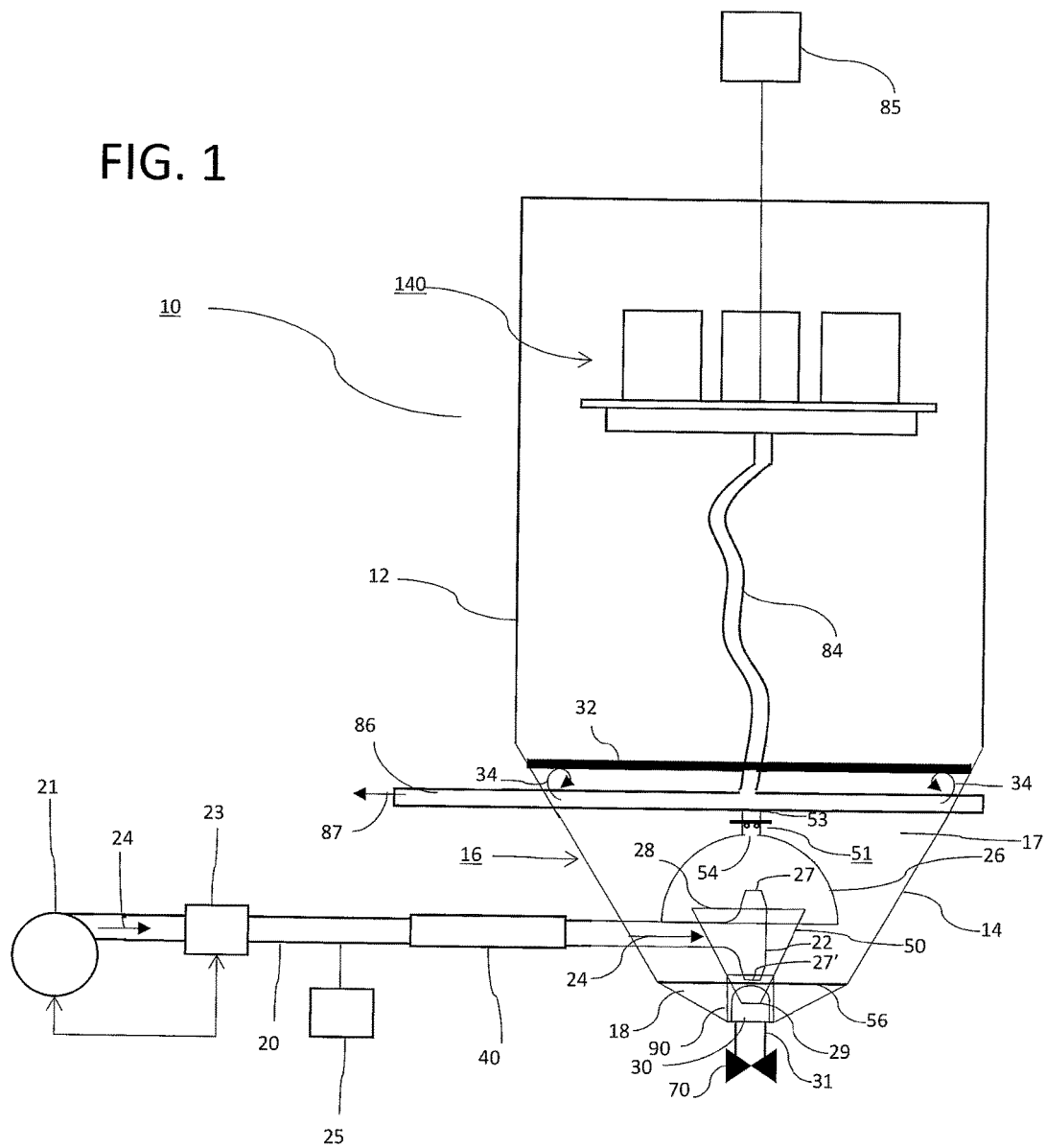
FIG. 1 provides an overview of the influent delivery system and settling tank with static mixing system.

Referring to FIG. 1, a currently preferred system 10 for static mixing in an industrial waste water settling tank to improve the recovery of solids and solvated materials therefrom comprises a tank 12 provided with a sludge hopper 14 in a bottom portion 16 of tank 12 (not to scale). The sludge hopper 14 comprises an upper portion 17 and a lower portion 18 separated by a scouring plate 56. In a currently preferred embodiment, tank 12 is cylindrical and with reference to FIG. 1 and FIG. 2, the upper portion 17 and lower portion 18 of sludge hopper 14 are conical. Sludge hopper 14 further comprises a bottom opening 30, drain 31 and drain valve 70.

Figure 3:
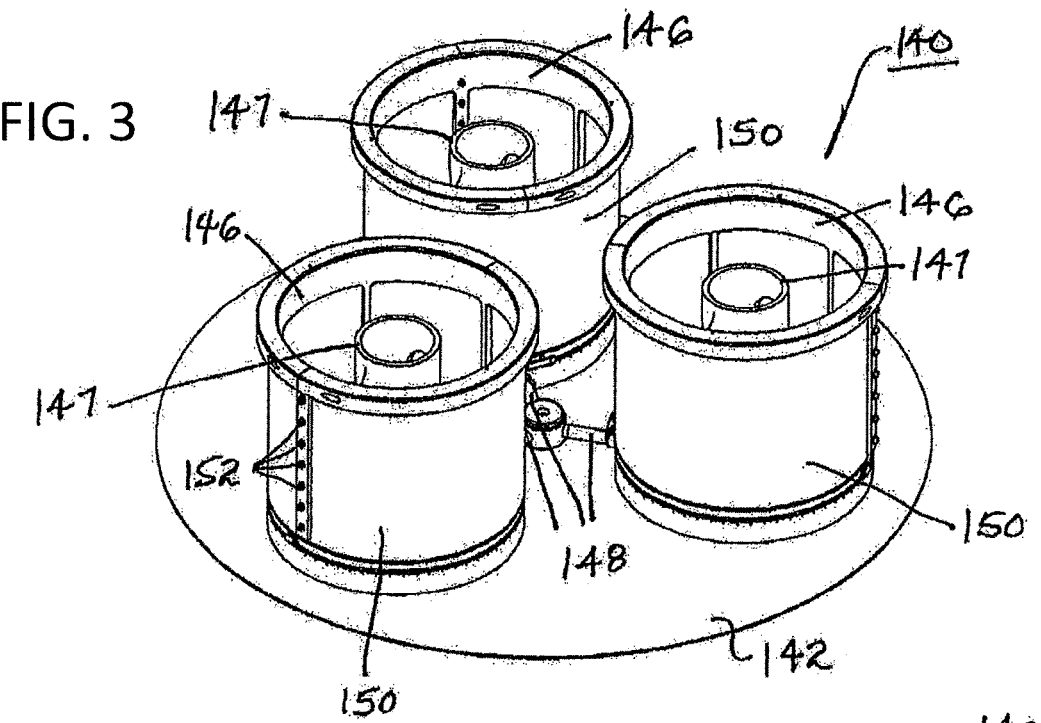
FIG. 3 provides an isometric view of decanter assembly 140, as disclosed in the '022 publication.
Figure 4:
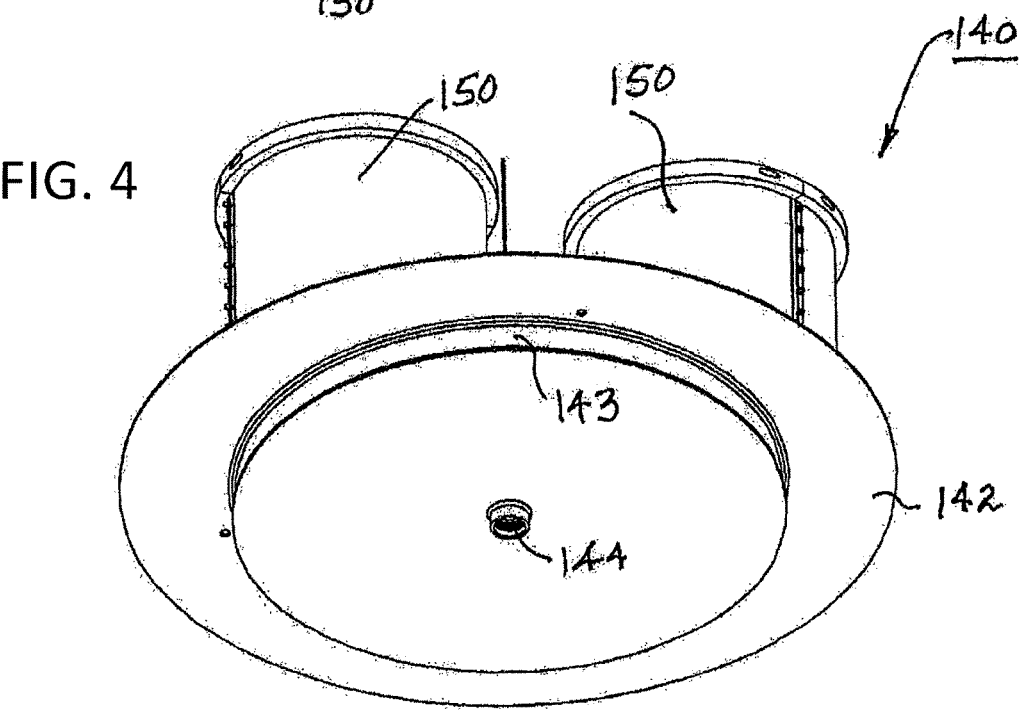
FIG. 4 provides a second isometric view of decanter assembly 140, as further disclosed in the '022 publication.

A decanter assembly 140 is provided within the clarification tank 12 outside of sludge hopper 14. Preferably, decanter assembly 140 is substantially similar to the exemplary decanter assembly 140 of the '022 publication as shown in FIG. 3 and FIG. 4. Decanter assembly 140 comprises a platform 142 including a drain manifold 143 having a central drain opening 144. Three decanter frames 146 are mounted to platform 142. Each decanter frame 146 includes a perforated central standpipe 147 that extends through an opening in the lower portion of the decanter frame 146 to connect to drain manifold 143. Each frame 146 is surrounded by a cylindrical screen 150 connected to frame 146 as by screws 152 in such a fashion that all influent flow entering frames 146 must pass through a screen 150. Preferably, screens 150 have a porosity in the range of 25-75 micrometers, and most preferably about 50 micrometers.

Returning to FIG. 1, drain manifold 143 (FIG. 4) is in fluid communication with effluent hose 84, which in turn is in fluid communication with effluent pipe 86 to decant screened waste water 87 that passes through the decanter frames 146, drain manifold 143, and effluent pipe 86. The decanter assembly 140 is at an elevation higher than the sludge hopper 14 and is raised and lowered via lift mechanism 85 to follow changes in level of the upper surface of waste water within the tank 12.

A waste water influent pipe 20 carries waste water and solids into tank 12. The flow of waste water influent is provided by a pump 21 and is controlled by flow control apparatus 23 which may include a flow meter and control valving (not shown) in known fashion. Further, dosing apparatus 25 may be provided for, e.g., adjusting pH of the influent, or adding coagulants and/or flocculants thereto. In a currently preferred embodiment, influent pipe 20 further includes an inline static mixer 40, such as for example a helical auger, arranged to provide mixing of coagulants and/or flocculants with the influent stream.

Preferably, waste water influent pipe 20 comprises a "T" 22 such that influent waste water 60 (reference, FIG. 2) is discharged upwards via a first nozzle 27 against a fluid deflector assembly 26 and downward via a second nozzle 27' against the sealed portion 29 of fluid containment assembly 50. Preferably, about 60% of the total flow is directed upward and about 40% is directed downward. Preferably, deflector assembly 26 is centrally disposed within the space enclosed by sludge hopper 14. Preferably, fluid deflector assembly 26 comprises a dome; however, within the scope of the present invention, a fluid deflector or fluid deflector assembly may take the form of any of various shapes as may be dictated by a particular application. By way of example and not limitation, a fluid deflector assembly may be trapezoidal rather than conical, as for example when used in conjunction with a rectangular tank.

Figure 5:
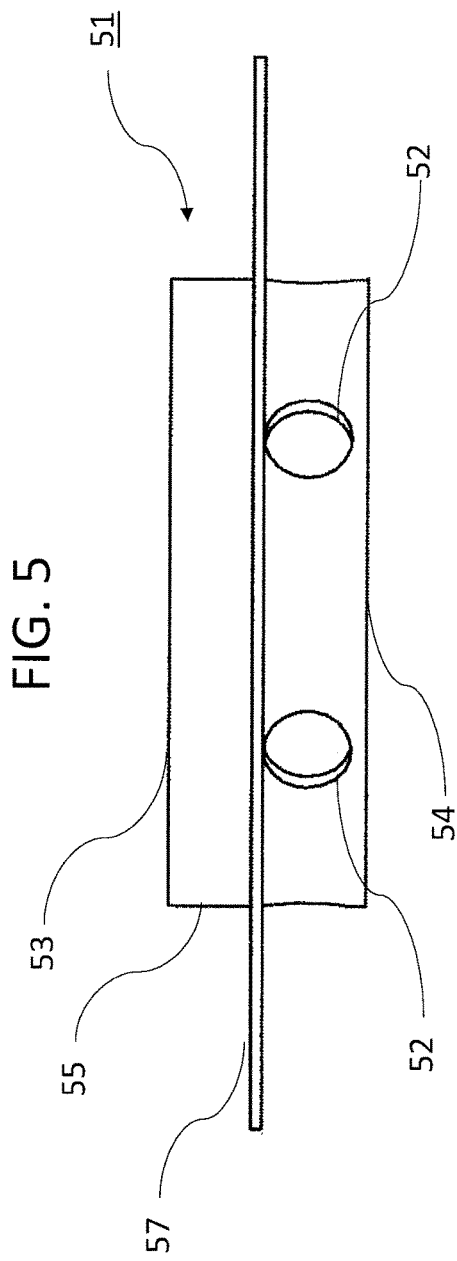
FIG. 5 provides a view of fluid dispersion apparatus 51.
Figure 6:
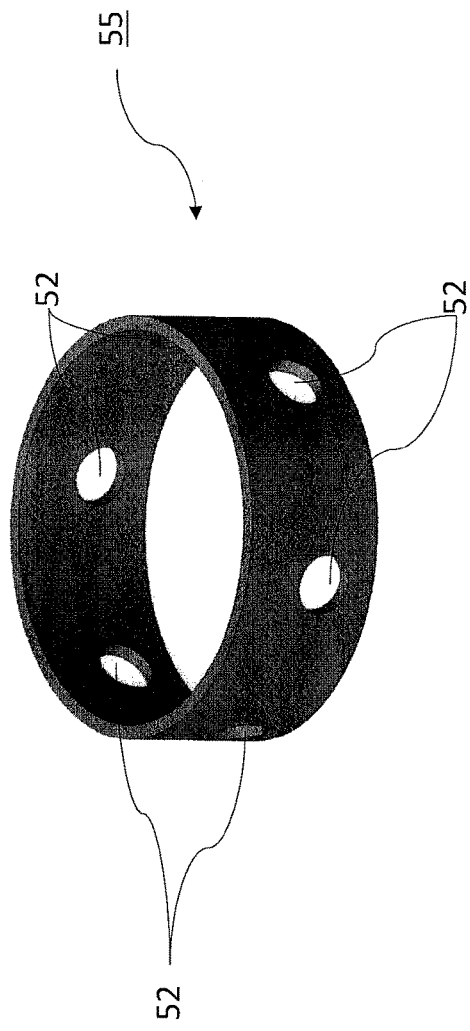
FIG. 6 provides a view of fluid dispersion apparatus 51 side wall 55.

A fluid dispersion assembly 51 is affixed to the upper portion of the fluid deflector assembly 26. With reference to FIG. 5 and FIG. 6, the fluid dispersion assembly 51 has upper sealed end 53, lower open end 54, and side wall 55 enclosing the interior volume of the fluid dispersion assembly 51. The fluid dispersion assembly 51 further comprises one or more holes 52 spaced around the side wall 55, and a fluid dispersion flange 57 positioned above the one or more holes 52 and extending outward from the side wall 55. In a currently preferred embodiment, holes 52 (FIG. 5 and FIG. 6) are circular and spaced uniformly around side wall 55. However, within the scope of the invention, holes 52 may take other forms and be arranged in alternative configuration around side wall 55. By way of example and not limitation, in alternative embodiments: holes 52' are horizontal slots (FIG. 7A); holes 52" are vertical slots (FIG. 7B); holes 52''' (FIG. 7C), are rectangular slots in two rows, the rectangular slots of the first row are offset from the rectangular slots of the second row; and holes 52'''' (FIG. 7D) are rectangular slots oriented at 45 degrees to the vertical. By way of example and not limitation, in alternate embodiments, the holes may be oval, triangular, or rhomboidal as dictated by a particular application.

The fluid dispersion assembly 51 is in fluid communication with the underside of deflector 26 via open lower end 54. With reference to FIG. 1, in one embodiment the upper sealed end 53 is affixed to effluent pipe 86 to mount and position the fluid deflector assembly 26. Preferably, fluid dispersion apparatus 51 is cylindrical and mounted centrally within the hopper 14 and with respect to the fluid deflector assembly 26 and nozzle 27. However, within the scope of the present invention a fluid dispersion assembly may take the form of any of various shapes or be alternately located, as may be dictated by a particular application. By way of example and not limitation, a fluid dispersion assembly may be rectangular rather than conical, as for example when used in conjunction with a rectangular tank.

Figure 2:
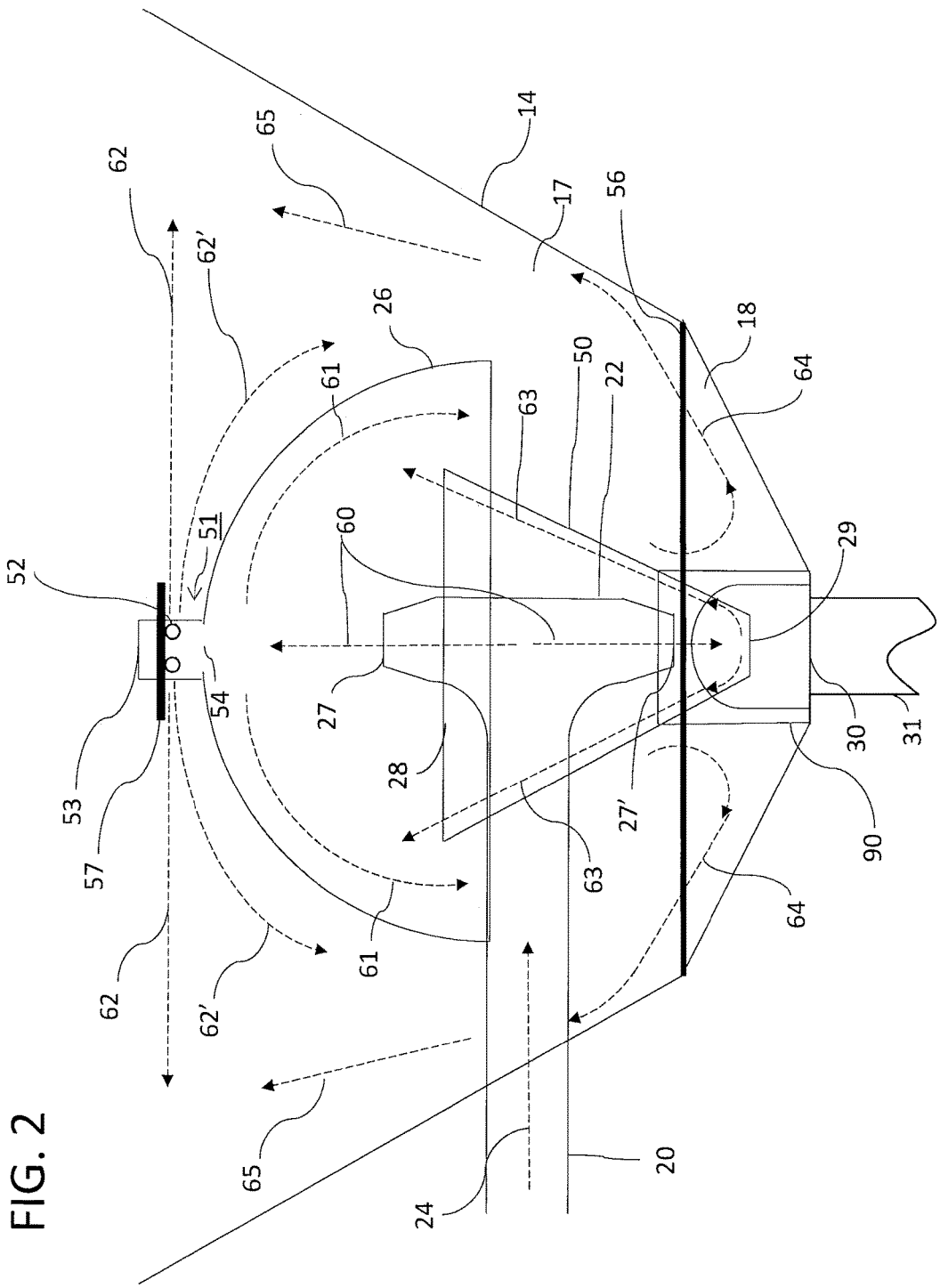
FIG. 2 provides an overview of a portion of the static mixing system situated in the lower portion of the tank, and a representation of the fluid flows provided by that portion of the static mixing system.

Continuing with FIG. 2, influent pipe 20 extends through the wall of fluid containment assembly 50. Preferably, fluid containment assembly 50 is conical with open portion 28 positioned centrally under the deflector assembly 26, and more preferably with open portion 28 located within the semi-enclosed region defined by the underside of a preferably dome shaped deflector assembly 26. Further, preferably sealed bottom 29 is a flat bottom centrally located under the lower nozzle 27' of the "T" 22. However, within the scope of the present invention, a fluid containment assembly may take the form of any of various shapes or be alternately located, as may be dictated by a particular application. By way of example and not limitation, a fluid containment assembly may be trapezoidal rather than conical, as for example when used in conjunction with a rectangular tank.

Figure 8A:
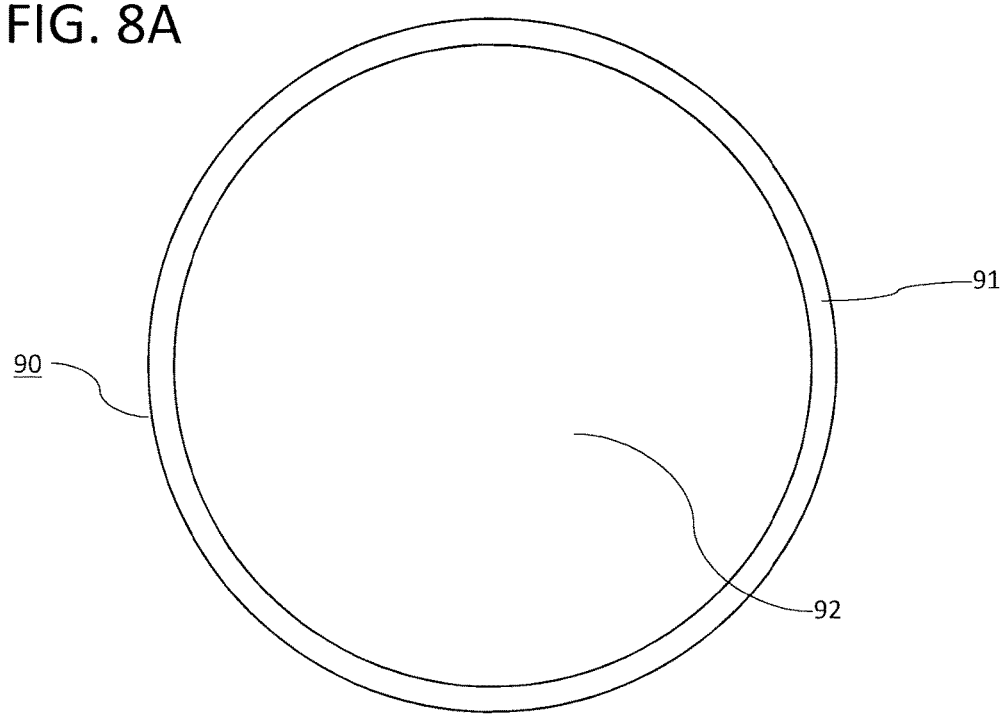
FIG. 8A provides a plan view of support pipe 58.
Figure 8B:
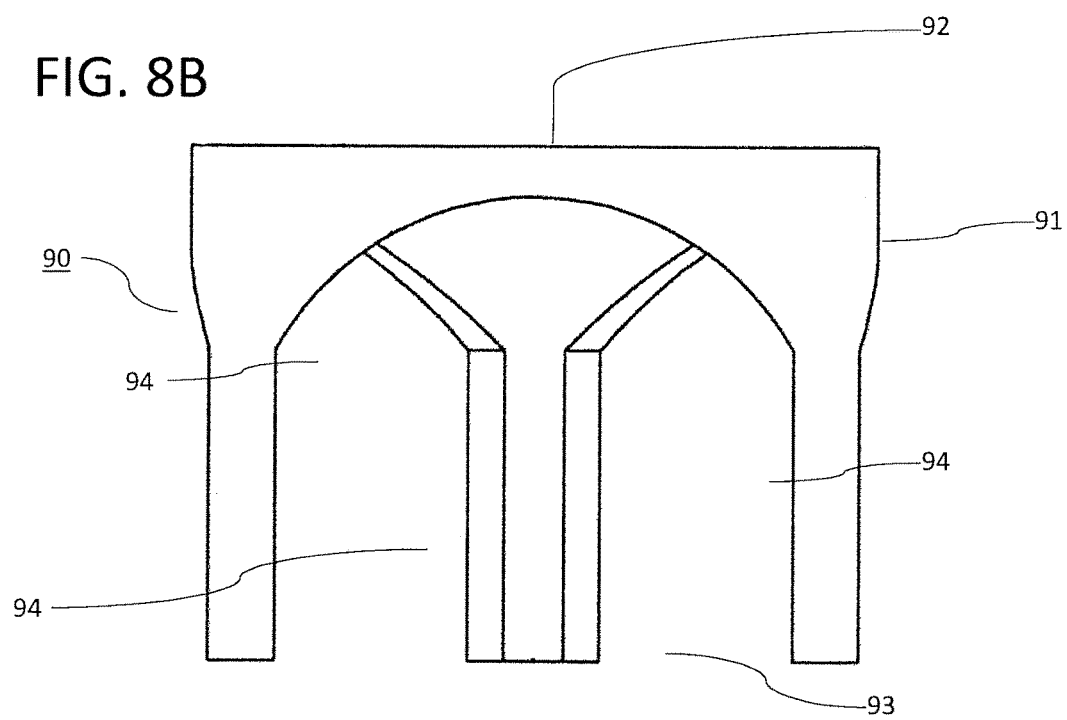
FIG. 8B provides an isometric view of support pipe 58.

The fluid containment assembly 50 is mounted to support pipe 90. With reference to FIG. 8A and FIG. 8B, support pipe 90 is cylindrical with side wall 91, an open upper end 92 and an open lower end 93. Side wall 91 has three openings 94 providing fluid communication between the exterior of support pipe 90 and open lower end 93. Referring again to FIG. 1 and FIG. 2, the lower portion of fluid containment assembly 50 extends through open upper end 92 of support pipe 90 to position fluid containment assembly 50 centrally with respect to support pipe 90 and prevent fluid communication between the exterior of support pipe 90 and the interior of support pipe 90 via open upper end 92. Support pipe 90 is mounted to the lower portion of sludge hopper 14 and arranged to provide fluid communication between the lower portion 18 of sludge hopper 14 and drain pipe 31 via openings 94. Preferably, support pipe 90 is mounted centrally with respect to sludge hopper 14.

Figure 10:
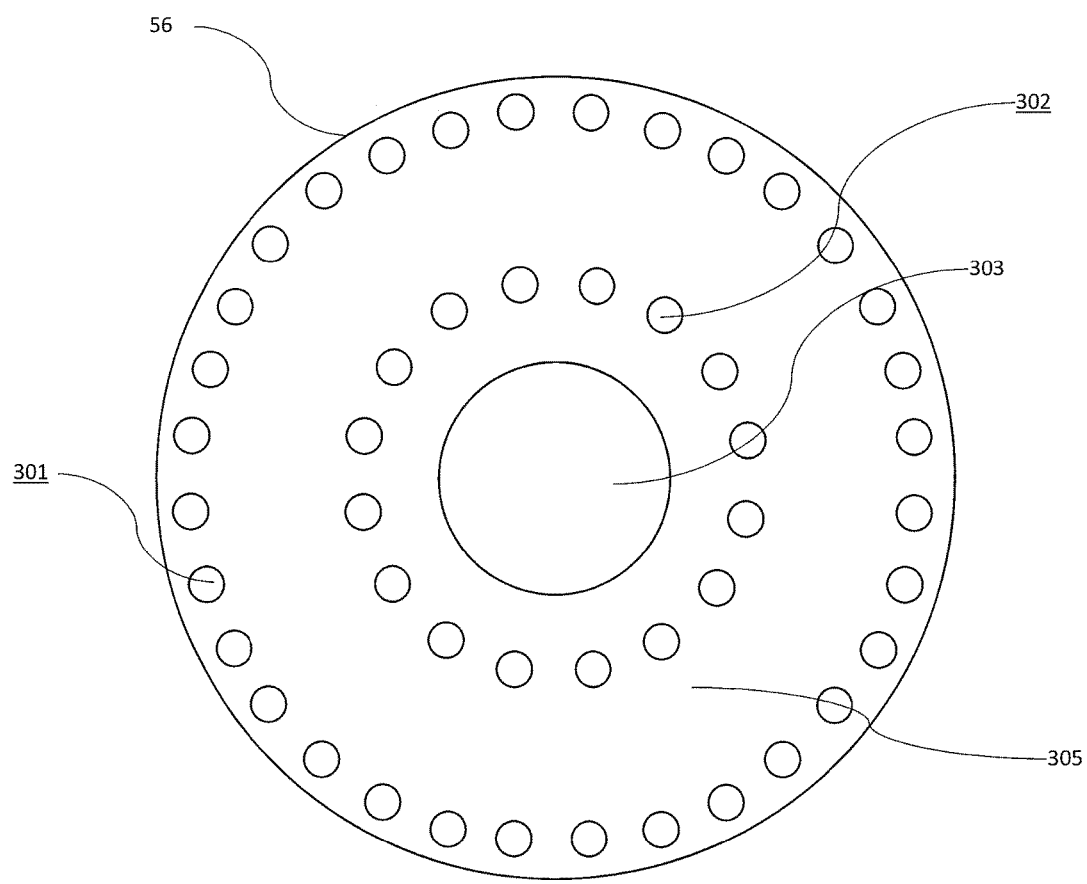
FIG. 10 Provides a view of scouring plate 56.

With reference to FIG. 10, scouring plate 56 is circular, comprising a first set of holes 301 spaced uniformly around an outer circumference and a second set of holes 302 spaced uniformly around an inner circumference, the two rings of holes 301, 302 defining a solid annular region 305 between them. Holes 301, 302 provide fluid communication between the upper portion 17 of sludge hopper 14 and lower portion 18. Scouring plate 56 extends radially from the side wall 91 of support pipe 90 to the wall of sludge hopper 14 around the circumference of support pipe 90. While scouring plate 56 is described with respect to a preferred arrangement, within the scope of the present invention, a mounting plate and mounting plate holes may take the form of any of various shapes as may be dictated by a particular application.

Figure 9:
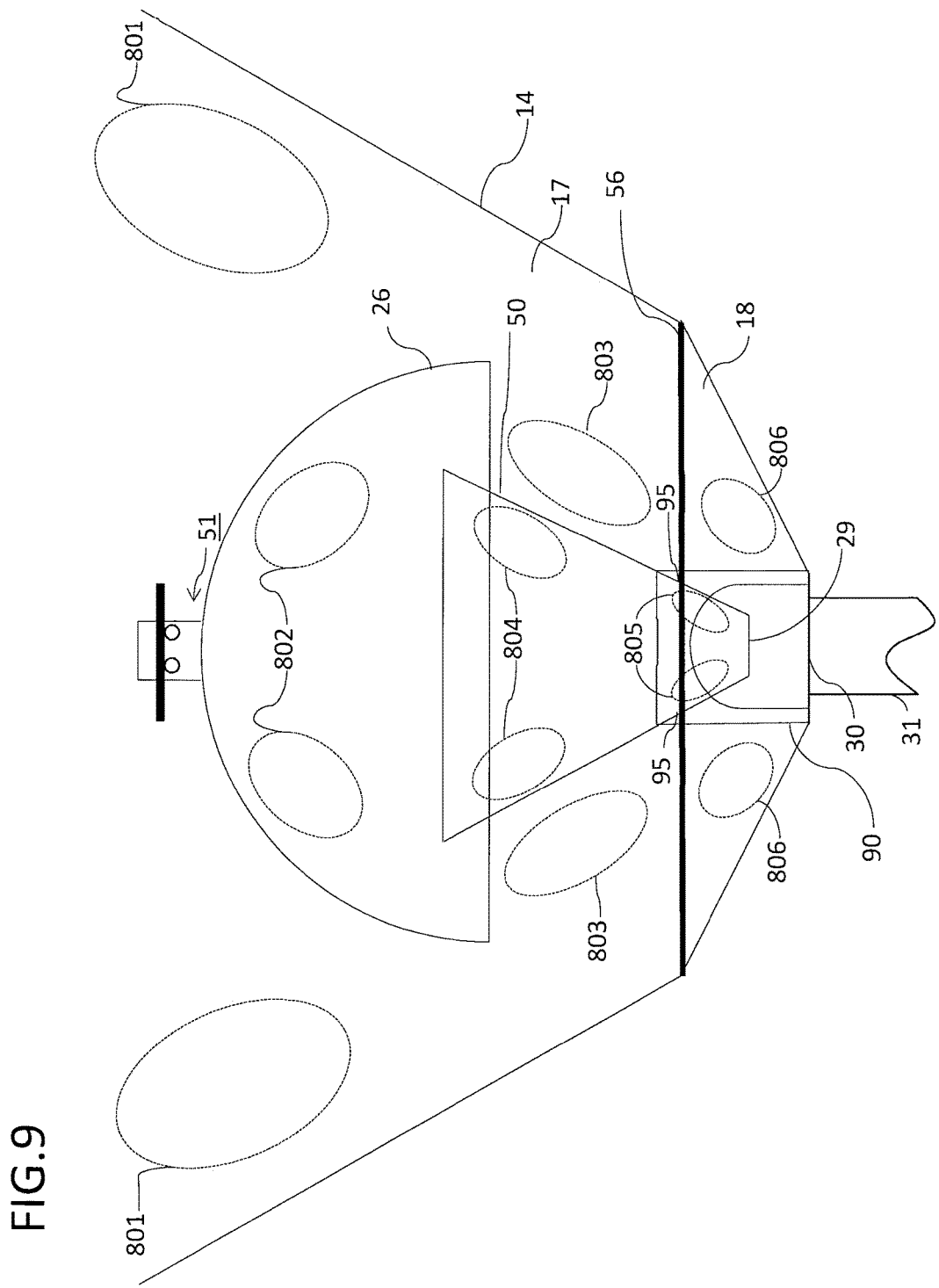
FIG. 9 provides an overview of the static mixing system situated in the lower portion of the tank to highlight certain aspects of the fluid containment assembly 50 and scouring plate 56 geometry.

An important aspect of the instant application is the elimination of regions in the sludge hopper 14 where sludge and solids can build up to interfere with operation resulting in maintenance or repair. Sludge and solids can accumulate where two surfaces meet to form an acute angle of less than 90 degrees. With reference to FIG. 9, support pipe 90 extends through scouring plate 56, abutting with the fluid containment assembly 50 to remove from the available interior volume of sludge hopper 14 the acute angle 95 formed where the surface of fluid containment assembly 50 and support pipe 90 meet.

System 10 has been modeled using computer simulation to identify the critical parameters of the design with an objective to establish fluid flows and mixing zones that enhance coalescence and settling of solids. Fluid flows 60, 61, 62, 62', 63, 64 and 65 (reference FIG. 2) and mixing zones 801, 802, 803, 804, 805, 806 (reference FIG. 9) are provided to show important aspects of the instant application as simulated with computer modeling (not necessarily to scale).

In operation, as part of a currently preferred embodiment, coagulants and flocculants added to the waste water influent via dosing system 25 are rapidly dispersed through the influent medium via inline static mixer 40. Influent waste water entering system 10 impinges on fluid deflector assembly 26 to slow the flow velocity of a first portion of the influent waste water 60 directed upward via first nozzle 27 and to redirect it generally outward and downward 61 in a circular pattern toward the walls and lower portion of sludge hopper 14. The fluid dispersion assembly 51 slows the flow velocity of a second portion of the influent waste water 60 directed upward via second nozzle 27 into the interior of the fluid dispersion assembly via lower open end 54 and redirects it outward in fluid flows 62 toward the walls of hopper 14 and fluid flows 62' generally downward in the direction of the scouring plate 56 and walls of the sludge hopper 14. Fluid dispersion plate 57 directs the fluid flows 62, 62' such that they are predominantly outward toward the sludge hopper wall and downward to the scouring plate rather than upward. Fluid containment assembly 50 slows the flow velocity of the influent waste water 60 directed downward via nozzle 27' and redirects the fluid flow to create upward flows 63 that interact with downward flows 61 to enhance mixing of solids in the waste water with any "seeded" sludge already present in the sludge hopper 14 from prior operation. The downward fluid flow from nozzle 27' scours the sealed bottom portion 29 of fluid containment assembly 50, preventing any undesirable build-up of sludge or solids. Fluid flows 62, 62' interact with upward fluid flows, e.g. 65, to reduce the velocity of upward fluid flows and associated undesirable upward flows of solids-rich water from the sludge hopper 14 into the upper regions of the tank 12.

Downward fluid flow 61 scours sludge and solids from the scouring plate 56 to prevent the undesirable compaction and build-up of sludge on the scouring plate 56, such as in annular region 305. Fluid flow 61 traverse the holes 301, 302 of scouring plate 56 to feed fluid flow 64 and create additional mixing zones. The upward portion of the fluid flows 64 interact with downward fluid flows 61, 62' and outward flows 62 and combine somewhat with 65 to create multiple mixing zones in the sludge hopper 14. The approximate location of representative mixing zones is indicated in FIG. 9 with respect to 801, 802, 803, 804, 805 and 806.

As the fluid level in tank 12 rises, the upward fluid velocity decreases as the surface area increases causing solids to begin to settle out of the waste water in sludge hopper 14, or to slow when the solids reach the cylindrical portion of the tank 12. Coalescence occurs during mixing of influent 24 with materials entrained in the sludge hopper 14 mixing zones through contact clarification. As additional influent 24 enters the sludge hopper 14, the mixing zones further slow the velocity of the via contact clarification and coalescence, creating an increased concentration of solids that further enhances coalescence.

During such static mixing, the flow of waste water and suspended solids near the tank wall above the dispersion plate 57 is vertical. Unimpeded, this flow has the undesirable effect of transporting solids-rich water into the upper part of tank 12 where the solids concentration is low, causing both a decrease in the rate of coalescence of the solids and additional settling time for the solids transported to the upper part of the tank. To counteract such tendency, a ring 32 is installed in the sludge hopper 14 above deflector assembly 26 to redirect upward vertical flow along the sides of the sludge hopper towards the center of the sludge hopper, thus keeping solids-rich waste water within the sludge hopper for continued coalescence and settling. Preferably, ring 32 is fabricated from stainless steel, fits tightly around the inside of the EPT tank 12, and is approximately 1 inch wide.

Subsequently, during a quiescent settling period after influent flow is terminated, the coalescent sinks into the bottom of the sludge hopper 14.

When the settling period is complete, most of the settled BOD is drained from the hopper, leaving some sludge as "seeds" for the next cycle, while the relatively clean water in the elevated clarification section of the EPT is drawn off via the decanter (not shown).

It is an objective of the instant application to provide an apparatus and method to first add and rapidly disperse coagulants to the influent waste water and then create mixing zones wherein the fluid velocity slows to reduce sheer and enhance the growth of flocs and coalescing materials to settle these materials from the waste water under the influence of gravity. It is an important feature of the invention that the static mixing apparatus provides efficient and rapid mixing of the influent 24 with material already in the sludge hopper 14 without generating sheering forces that will break flocs apart as may occur with dynamic mixing. Formation of flocks from particulate matter in influent waste water entering the tank is increased by a method that impinges such particles on other solids materials such as but not limited to sludge already present therein, causing coalescence thereof into larger flocs and coalesced materials having greater settling tendency to form a new layer of coalesced materials. In the present invention, such impingement is achieved by controlling the influent flow rate in combination with the arrangement of fixed deflector 26, fluid containment apparatus 50, fluid dispersion apparatus 51 and tank components. The static mixing apparatus maximizes the materials removed from the influent 24 during the coalescence while reducing the amount of chemicals used to coalesce these materials. Additionally, by causing coalescence into larger particles having greater settling tendency, the duration of the settling period is shortened, increasing the process throughput per unit time of the EPT.

An important aspect of the sizing and arrangement of the assemblies comprising system 10 is balancing the velocities and flow volumes associated with the fluid flows, e.g., 60, 61, 62, 62', 63, 64, 65, in the sludge hopper 14 to create stable mixing zones with desirable flow velocities. To provide control of the fluid velocities in the sludge hopper 14, influent waste water 20 is delivered at a substantially constant flow rate. Analysis using a computer simulation that accounts for frictional losses inside pipes and other surfaces of the apparatus in sludge hopper 14 was used to establish fluid flows and mixing zones with a desirable fluid velocity in the range of 1 ft/s (foot per second) to 3 ft/s and more preferably 1 ft/s to 2 ft/s. This velocity is desirable as it provides sufficient inertia to enhance mixing and coalescence without tearing apart the coalescing particles. In a currently preferred embodiment, a 4-inch diameter influent pipe 20 delivers influent 24 at a substantially constantly flow rate of 200 gallons per minute. The velocity of fluid in the influent pipe ranges from 5 ft/s to 7 ft/s. The velocity of the influent 20 is rapidly slowed. The velocity of the upward flow 60 from the 3-inch diameter first nozzle 27 ranges from approximately 6.4 ft/s to 7.6 ft/s with a flow rate of about 136 gallons per minute. The velocity of the downward flow 60 from the 2-inch diameter second nozzle 27' ranges from approximately 7.0 ft/s to 7.3 ft/s with a flow rate of about 84 gallons per minute. Mixing, deflection, and interaction of the flows further slows the fluid velocity. Fluid flow velocities in mixing zones 802, 804, 805 and 806 are on the order of 1 ft/s to 3 ft/s. Fluid flow velocities in mixing zones 801 and 803 are on the order of 1 ft/s to 2 ft/s.

Various changes may be made to the structure and method embodying the principles of the invention. The foregoing embodiments are set forth in an illustrative and not in a limiting sense. The scope of the invention is defined by the claims appended hereto.

What is claimed is:

1. A system to increase the percentage of recovery of entrained solids and solvated materials from waste water, comprising:
   a) a settling tank having a circumferential wall, an upper portion and a lower portion;
   b) a fluid containment assembly disposed in said lower portion of said settling tank, said fluid containment assembly having an open top oriented toward said upper portion of said settling tank, a circumferential side wall and an enclosed bottom, said circumferential side wall and said enclosed bottom defining an interior of said fluid containment assembly;
   c) a fluid deflector disposed within said settling tank, said fluid deflector comprising an upper side oriented toward said upper portion of said settling tank and a lower side oriented toward said open end of said fluid containment assembly, and a hole extending from said lower side to said upper side;
   d) an inlet pipe for introduction of waste water into the settling tank, said inlet pipe having a first discharge outlet disposed in said interior of said fluid containment assembly, said first discharge outlet oriented to discharge a first portion of said waste water toward said lower side of said fluid deflector and a second discharge outlet disposed in said interior of said fluid containment assembly, said second discharge outlet oriented to discharge a second portion of said waste water toward said enclosed bottom of said fluid containment assembly;
   e) a fluid distribution assembly comprising an upper sealed end, a lower open end, a circumferential side wall and one or more holes in said circumferential side wall, said one or more holes having a vertical uppermost extent, said fluid distribution assembly disposed on said upper side of said fluid deflector, and positioned with said lower open end over of said fluid distribution assembly positioned over said hole in said fluid deflector, wherein the shape of said fluid dispersion assembly is selected from the group consisting of cylindrical, conical, frustrum, rectangular, and trapezoidal and the shape of one of said one or more holes in said circumferential side wall of said fluid distribution assembly is selected from the group consisting of circular, oval, rectangular, triangular, and rhomboid; and,
   f) a flange extending circumferentially around and outward from said circumferential side wall of said fluid distribution assembly, wherein the vertical position of said flange is between said vertical uppermost extent of said one or more holes in said circumferential side wall of said fluid distribution assembly and said sealed end of said fluid dispersion assembly.

2. A system in accordance with claim 1 further comprising a ring disposed along said circumferential wall of said tank at a vertical location above said fluid deflector.

3. A system in accordance with claim 1 further comprising a scouring plate disposed in said lower portion of said settling tank separating said lower portion of said settling tank into an upper portion and a lower portion, wherein said fluid deflector and said open top of said fluid containment assembly are in said upper portion of said lower portion of said settling tank, said scouring plate further comprising one or more holes providing fluid communication between said upper portion of said lower portion of said settling tank and said lower portion of said lower portion of said settling tank and the shape of one hole of said one or more holes in said scouring plate is selected from the group consisting of circular, oval, rectangular, triangular, and rhomboidal.

4. A system in accordance with claim 3 wherein the shape of said scouring plate is selected from the group consisting of circular, oval, rectangular, triangular, and rhomboidal.

5. A system in accordance with claim 1 wherein said circumferential side wall of said fluid containment assembly has an uppermost portion and said fluid deflector has a lowermost portion and the uppermost portion of said circumferential side wall of said fluid containment assembly is higher than the lowermost portion of said fluid deflector.

6. A system in accordance with claim 1 wherein said circumferential side wall of said fluid containment assembly has an outermost portion comprising that portion of said circumferential side wall extending the maximum horizontal distance from a vertical axis extending through the center of said fluid containment assembly and said fluid deflector has an outermost portion comprising that portion of the fluid deflector extending the maximum horizontal distance from a vertical axis extending through the center of said fluid detector, wherein the outermost portion of said fluid deflector extends beyond the outermost portion of said circumferential side wall of said fluid containment assembly.

7. A system in accordance with claim 1 wherein the diameter of said fluid deflector is at least equal to the inner diameter of said first discharge outlet.

8. A system in accordance with claim 1 wherein said fluid containment assembly circumferential side wall forms a subtended cone.

9. A system in accordance with claim 1 wherein the discharge from said first discharge outlet is greater than the discharge from said second discharge outlet.

10. A system in accordance with claim 1 wherein said first and second discharge outlets are arranged such that the upward flow rate is about 1.2 to about 2.0 times greater than the flow rate of the downward flow.

11. A system in accordance with claim 1 further comprising a pump, a fluid container containing fluid, and a port on said inlet pipe, said port located upstream of said first discharge outlet and said second discharge outlet, said pump arranged to pump said fluid from said fluid container and discharge said fluid into said inlet pipe via said port.

12. A system in accordance with claim 11 wherein said fluid comprises one of a coagulant, a flocculant, and a second waste water.

13. A system in accordance with claim 12 wherein said inlet pipe further comprises an inline mixer located in said inlet pipe between the position of said port and the position of said first discharge outlet and said second discharge outlet.

14. A system to increase the percentage of recovery of entrained solids and solvated materials from waste water, comprising:
   a) a settling tank having a circumferential wall, an upper portion and a lower portion;
   b) a fluid containment assembly disposed in said lower portion of said settling tank, said fluid containment assembly having an open top oriented toward said upper portion of said settling tank, a circumferential side wall and an enclosed bottom, said circumferential side wall and said enclosed bottom defining an interior of said fluid containment assembly;

c) a fluid deflector disposed within said settling tank, said fluid deflector comprising an upper side oriented toward said upper portion of said settling tank and a lower side oriented toward said open end of said fluid containment assembly, and a hole extending from said upper side to said lower side;

d) an inlet pipe for introduction of waste water into the settling tank, said inlet pipe having a first discharge outlet disposed in said interior of said fluid containment assembly, said first discharge outlet oriented to discharge a first portion of said waste water toward said lower side of said fluid deflector and a second discharge outlet disposed in said interior of said fluid containment assembly, said second discharge outlet oriented to discharge a second portion of said waste water toward said enclosed bottom of said fluid containment assembly;

e) a scouring plate disposed in said lower portion of said settling tank, said scouring plate separating said lower portion of said settling tank into an upper portion and a lower portion, wherein said fluid deflector and said open top of said fluid containment assembly are in said upper portion of said lower portion of said settling tank, said scouring plate further comprising one or more holes providing fluid communication between said upper portion of said lower portion of said settling tank and said lower portion of said lower portion of said settling tank, wherein the shape of one of said one or more holes of said scouring plate is selected from the group consisting of circular, oval, rectangular, triangular, and rhomboidal, and the shape of said scouring plate is selected from the group consisting of circular, oval, rectangular, triangular, and rhomboidal.

15. A system in accordance with claim 14 further comprising a fluid distribution assembly comprising an upper sealed end, a lower open end, a circumferential side wall and one or more holes in the circumferential side wall, said fluid distribution assembly disposed on said upper side of said fluid deflector, wherein the lower open end of said fluid dispersion assembly is in fluid communication with the lower side of the fluid deflector.

16. A system in accordance with claim 15 wherein the shape of said fluid dispersion assembly is selected from the group consisting of cylindrical, conical, frustrum, rectangular, and trapezoidal.

17. A system in accordance with claim 15 where said fluid distribution assembly further comprises a flange extending circumferentially around and outward from a said circumferential side wall of said fluid distribution assembly.

18. A system in accordance with claim 17 wherein said one or more holes in said circumferential side wall of said fluid distribution assembly have a vertical uppermost extent and wherein, the vertical position of said flange is between said vertical upper most extent of said one or more holes in said circumferential side wall of said fluid distribution assembly and said sealed end of said fluid dispersion assembly.

19. A system in accordance with claim 15 wherein the shape of one of said one or more holes in said circumferential sidewall of said fluid distribution assembly is selected from the group consisting of circle, oval, rectangular, triangular, and rhomboid.

20. A system in accordance with claim 14 said fluid containment assembly circumferential side wall forms a subtended cone.

* * * * *